United States Patent
Heinonen

(10) Patent No.: US 10,457,420 B2
(45) Date of Patent: Oct. 29, 2019

(54) APPARATUS FOR PROVIDING MAINTENANCE AND SHELTER TO DRONE

(71) Applicant: Sharper Shape Oy, Espoo (FI)

(72) Inventor: Tero Heinonen, Järvenpää (FI)

(73) Assignee: Sharper Shape Oy, Espoo (FI)

( * ) Notice: Subject to any disclaimer, the term of this patent is extended or adjusted under 35 U.S.C. 154(b) by 462 days.

(21) Appl. No.: 15/359,878

(22) Filed: Nov. 23, 2016

(65) Prior Publication Data

US 2018/0141680 A1    May 24, 2018

(51) Int. Cl.
| | |
|---|---|
| *B64F 1/12* | (2006.01) |
| *B64C 39/02* | (2006.01) |
| *B64F 1/24* | (2006.01) |
| *B64F 5/30* | (2017.01) |
| *B60L 53/14* | (2019.01) |
| *B60L 53/12* | (2019.01) |
| *B60L 53/80* | (2019.01) |
| *B60L 53/30* | (2019.01) |
| *B60L 53/31* | (2019.01) |
| *B60L 53/51* | (2019.01) |
| *B60L 53/52* | (2019.01) |

(52) U.S. Cl.
CPC ............... *B64F 1/12* (2013.01); *B60L 53/12* (2019.02); *B60L 53/14* (2019.02); *B60L 53/30* (2019.02); *B60L 53/31* (2019.02); *B60L 53/51* (2019.02); *B60L 53/52* (2019.02); *B60L 53/80* (2019.02); *B64C 39/024* (2013.01); *B64F 1/24* (2013.01); *B64F 5/30* (2017.01); *B60L 2200/10* (2013.01); *Y02T 10/7005* (2013.01)

(58) Field of Classification Search
CPC .... B64F 1/007; B64F 1/12; B64F 1/24; B64C 2201/201
See application file for complete search history.

(56) References Cited

U.S. PATENT DOCUMENTS

| | | | |
|---|---|---|---|
| 9,718,564 B1* | 8/2017 | Beckman ........... G06Q 10/0832 |
| 2017/0021942 A1* | 1/2017 | Fisher .................... B64C 29/02 |
| 2017/0050749 A1* | 2/2017 | Pilskalns ................ B64F 1/362 |
| 2017/0225802 A1* | 8/2017 | Lussier .................... B64F 1/00 |
| 2018/0029723 A1* | 2/2018 | Krauss .................... B64F 1/00 |
| 2018/0245365 A1* | 8/2018 | Wankewycz .......... B64C 39/024 |

* cited by examiner

Primary Examiner — Philip J Bonzell
Assistant Examiner — Tye William Abell
(74) Attorney, Agent, or Firm — Ziegler IP Law Group, LLC

(57) ABSTRACT

An apparatus for providing maintenance and shelter to at least one drone. The apparatus includes at least one maintenance unit operable to provide maintenance to a drone that has arrived for maintenance thereat; a base structure for providing support to the at least one maintenance unit; at least one landing structure suitable for the drone to land thereat, each landing structure including a first actuator that is operable to move the landing structure in relation to the base structure, so as to align the drone landed on the landing structure with respect to the at least one maintenance unit; and means for supporting the base structure on ground, the means for supporting the base structure operable to alter position of the base structure to provide shelter to the landing structure.

12 Claims, 4 Drawing Sheets

APPARATUS FOR PROVIDING MAINTENANCE AND SHELTER TO DRONE

TECHNICAL FIELD

The present disclosure relates generally to unmanned aerial vehicles such as drones; and more specifically, to an apparatus for providing maintenance and shelter to at least one drone.

BACKGROUND

Unmanned aerial vehicles (UAVs), more commonly referred to as drones, are unmanned aircrafts. A drone may be flown by an operator remotely or it may fly autonomously based on a pre-programmed flight plan. Drones may be used for various commercial and non-commercial purposes. For example, the drones may be used for survey, search and rescue, surveillance purposes and so forth.

Generally, the drones are required to fly from a base station to a worksite to perform any of the above-mentioned tasks. Thereafter, the drones may return to the base station for recharge, regular maintenance, shelter and so forth. Typically, the base station may be distantly located from the worksites, and the jobs (of recharging, maintenance, sheltering and so forth) require manual intervention. Therefore, the mode of operation mentioned herein may be both power and time consuming, and may not be favorable for attending to drones subjected to any emergency. One way to address the above mentioned problem may include stationing the drones near a worksite. However, stationing a drone near a worksite may be associated with various challenges. For example, a drone stationed near a worksite may be subjected to severe weather conditions, such as storm, rain, snow and the like. Similarly, a drone landing pad may be subject to severe weather condition such as hurricanes, tornadoes, high wind, and flooding which may destroy the landing pad. Further, the stationed drone may be subjected to the problems of unwanted vegetation that may grow around a drone station; and damages that may be caused to the drone station by inhabiting insects, birds and animals of the worksite. Additionally, the aspect of time consumption due to manual intervention still remains unattended.

Therefore, in light of the foregoing discussion, there exists a need to overcome the aforementioned drawbacks of maintaining and sheltering drones.

SUMMARY

The present disclosure seeks to provide an apparatus for providing maintenance and shelter to at least one drone. The present disclosure seeks to provide a solution to the existing problem of power and time consuming mode of operation for drones. An aim of the present disclosure is to provide a solution that overcomes at least partially the problems encountered in prior art, and provides autonomous maintenance and sheltering for the drones.

In one aspect, an embodiment of the present disclosure provides an apparatus for providing maintenance and shelter to at least one drone, the apparatus comprising:
- at least one maintenance unit operable to provide maintenance to a drone that has arrived for maintenance thereat;
- a base structure for providing support to the at least one maintenance unit;
- at least one landing structure suitable for the drone to land thereat, wherein each landing structure comprises a first actuator that is operable to move the landing structure in relation to the base structure, so as to align the drone landed on the landing structure with respect to the at least one maintenance unit, thereby enabling the at least one maintenance unit to provide maintenance to the drone; and
- means for supporting the base structure on ground, the means for supporting the base structure operable to alter position of the base structure to provide shelter to the landing structure.

Embodiments of the present disclosure substantially eliminate or at least partially address the aforementioned problems in the prior art, and provides an apparatus that enables autonomous maintenance and sheltering for the drones.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawing. For the purpose of illustrating the present disclosure, exemplary constructions of the disclosure are shown in the drawing. However, the present disclosure is not limited to specific methods and instrumentalities disclosed herein. Moreover, those in the art will understand that the drawing is not to scale. Wherever possible, like elements have been indicated by identical numbers.

Embodiments of the present disclosure will now be described, by way of example only, with reference to the following diagram wherein.

Figure 1:
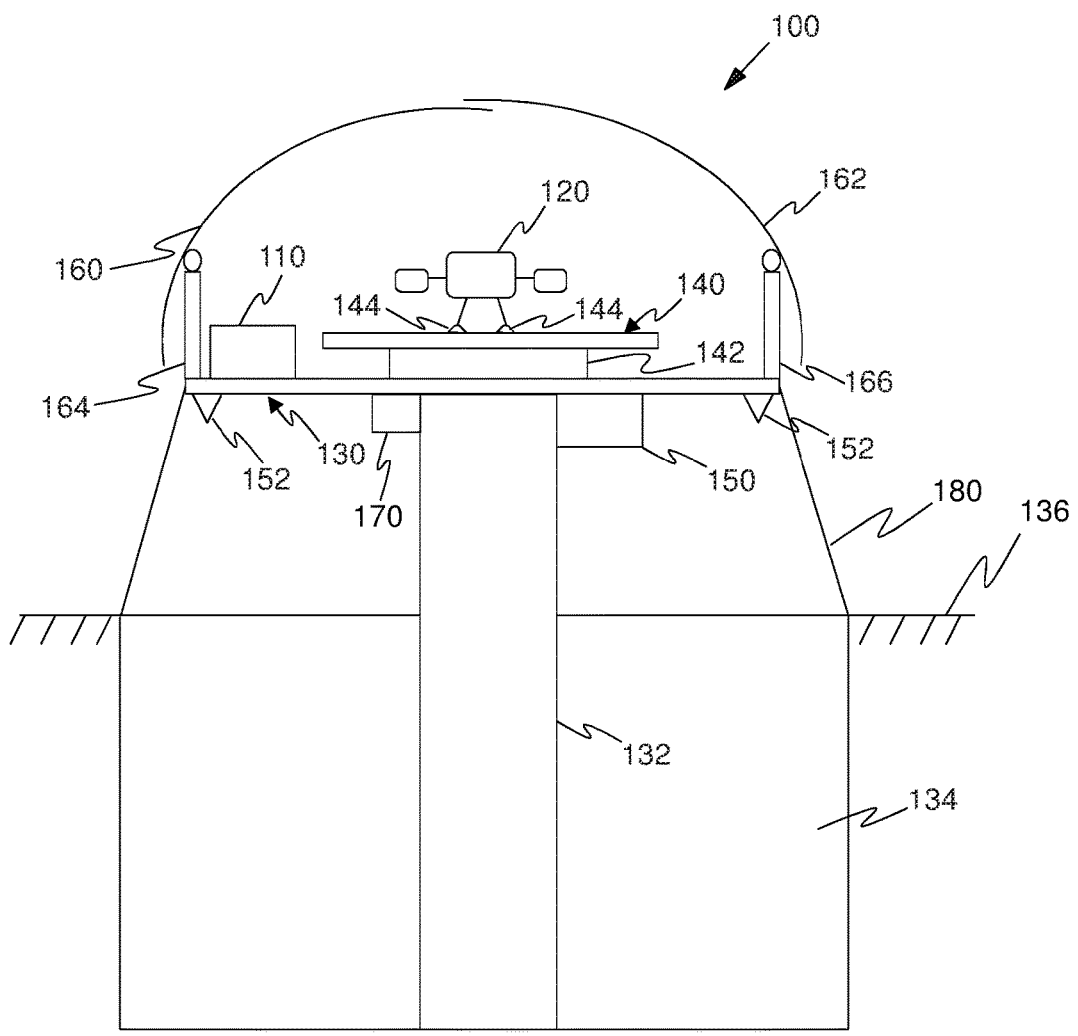
FIG. 1 is a schematic illustration of an apparatus for providing maintenance and shelter to at least one drone, in accordance with an embodiment of the present disclosure.

In the accompanying drawing, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an apparatus for providing maintenance and shelter to at least one drone, the apparatus comprising:

- at least one maintenance unit operable to provide maintenance to a drone that has arrived for maintenance thereat;
- a base structure for providing support to the at least one maintenance unit;
- at least one landing structure suitable for the drone to land thereat, wherein each landing structure comprises a first actuator that is operable to move the landing structure in relation to the base structure, so as to align the drone landed on the landing structure with respect to the at least one maintenance unit, thereby enabling the at least one maintenance unit to provide maintenance to the drone; and
- means for supporting the base structure on ground, the means for supporting the base structure operable to alter position of the base structure to provide shelter to the landing structure.

The present disclosure provides an apparatus that enables efficient (less power and time consuming) mode of operation for drones. Specifically, the apparatus of the present disclosure enables autonomous maintenance and sheltering of the drones near a worksite. For example, a maintenance unit of the apparatus may be operable to perform autonomous maintenance actions (such as charge or change battery, clean the drone, replace changeable parts and so forth) for the drones. Further, as the apparatus may be located or stationed near the worksite, which may enable in quickly attending to drones subjected to any emergency. Moreover, the apparatus may be designed for conveniently handling harsh weather conditions, such as storm, rain, flood, snow and the like, to save the drones from such harsh weather conditions. Additionally, the apparatus may include means to address challenges of unwanted vegetation and probable damages that may be caused to the drone station by inhabiting insects, birds and animals of the worksite. This enables in providing uninterrupted operation to the drones.

In an embodiment, a drone may be an unmanned aerial vehicle (or UAV). Specifically, the drone may be operated fully or partially autonomously for real world applications (or missions) such as asset inspection, aerial photography, disaster damage assessment and so forth. Optionally, the drone may be operated using on-board computers or remotely located human operators.

According to an embodiment, the drone may comprise at least one sensor. Specifically, the at least one sensor may be a part of a payload of the drone. Further, the payload may comprise one or more cameras, a light detection and ranging device, a radar, a processor for recording and analyzing measured data, a power source (such as rechargeable battery) and so forth. The sensor may include temperature sensor, pressure sensor, inertial measurement unit (IMU), bio sensor, proximity sensor and the like.

In one embodiment, the drone may comprise a global positioning system that may enable in monitoring location of the drone. Additionally, the drone may comprise a communication interface that communicably couples the drone to a ground control station, which may remotely control the drone. In one embodiment, the ground control station may be communicably coupled to the drone via a network, such as radio network, cellular network, and so forth.

In one embodiment, the drone may comprise other components such as a propulsion system, a flight control system, a navigation system, a sensor system, a communication system, a power system and an airframe. The propulsion system may include an engine and a means to propel the engine to assist in providing movement to the drone. The flight control system may enable controlling operation modes of the drone. The navigation system may provide location data and controls a heading direction of the drone. The sensor system may collect various types of data including environmental conditions and the like. The communication system may provide communication between the drone and the ground control station. The power system supplies power to operate the various components of the drone. The airframe refers to the physical structure including blades, actuators, body and the like.

The apparatus of the present disclosure includes at least one maintenance unit operable to provide maintenance to a drone that has arrived for maintenance thereat. Typically, the maintenance unit may include the ability to either replace or repair the structural and/or functional elements associated with the function of the drone. Specifically, the maintenance unit may include various replaceable or repairable structural and/or functional elements, such as hardware, software and firmware and so forth, associated with the drone.

According to an embodiment, the at least one maintenance unit may also comprise a manoeuvring mechanism such as robotic arms, hands or grippers, for manoeuvring the structural elements while maintenance. The at least one maintenance unit may also comprise a processor having a control unit for controlling such robotic arms. The at least one maintenance unit may also comprise algorithms or instructions capable of being executed on the processor for analysing the drone to identify required maintenance action, and to perform such identified required maintenance action on the drone. The required maintenance action may include either replacement or correction of the structural and/or functional elements associated with the operation of the drone.

According to an embodiment, the at least one maintenance unit may include a battery changing unit, a battery charging unit, a cleaning unit, a measurement-device changing unit, and a replaceable-part changing unit.

In one embodiment, the battery changing unit of the maintenance unit may include at least one detachable and rechargeable battery that acts as the power source. Further, the battery changing unit may be operatively coupled to the manoeuvring mechanism, which may enable in replacing a used battery (of the drone) with a fully charged rechargeable battery.

In one embodiment, the battery charging unit of the maintenance unit may be associated with a charging module, for example, solar cells or wind turbine. Further, the battery charging unit may include a wired or a wireless charging arrangement, operatively coupled to the charging module, for either charging the standby rechargeable battery or the battery coupled to the drone.

In an embodiment, the cleaning unit of the maintenance unit may include an air or fluid based cleaning arrangement. For example, the cleaning unit may include nozzles operable to deliver high speed stream of air and/or fluid for cleaning the drone.

In one embodiment, the measurement-device changing unit of the maintenance unit may comprise one or more replaceable sensor. The measurement-device changing unit may be operatively coupled to the manoeuvring mechanism, which may enable in replacing or repairing a damaged or a faulty sensor.

In an embodiment, the replaceable-part changing unit of the maintenance unit may comprise mechanical or electro-mechanical elements, such as fasteners, seals, blades, motors, lights and the like. The replaceable-part changing unit may be operatively coupled to the manoeuvring mechanism, which may enable in replacing or repairing a damaged or faulty replaceable-part.

The apparatus also includes a base structure for providing support to the at least one maintenance unit. In one embodiment, the base structure may be a fixed flat platform configured to support the at least one maintenance unit thereon. In one embodiment, the base structure may include an aerodynamic shape, such as a symmetrical airfoil shape (when viewed from top). Alternatively, the base structure may be circular, oval or polygonal platform supporting the maintenance unit at one side or corner of the base structure.

The apparatus further includes at least one landing structure suitable for the drone to land thereat. The landing structure comprises a first actuator that is operable to move the landing structure in relation to the base structure, so as to align the drone landed on the landing structure with respect to the at least one maintenance unit, thereby enabling the at least one maintenance unit to provide maintenance to the drone.

According to an embodiment, the landing structure may be a movable flat platform, which is smaller in size as compared to a size of the base structure. It may be evident that, based on the size of the base structure, a plurality of landing structures may be arranged on the base structure to simultaneously attend to multiple drones. Further, each of the landing structure (i.e. movable flat platform) may be supported on the base structure with the help of the first actuator. In one embodiment, the first actuator may include a motor and motion transmission means, such as gears, shafts and the like, operable to move the landing structure in relation to the base structure.

In an example, the movement of the landing structure in relation to the base structure comprises at least one of a lateral movement, a rotational movement, and a vertical movement. The said movement of the landing structure in relation to the base structure enables in aligning the drone landed on the landing structure with respect to the maintenance unit. This enables the maintenance unit to suitably perform maintenance action on the drone. Specifically, the said movement of the landing structure and the manoeuvring mechanism of the maintenance unit in combination, may enable in suitably performing the maintenance actions on the drone. For example, while changing a battery, a measurement-device or a replaceable-part, the drone may be suitably oriented or held in place on the landing structure, which makes the performance of maintenance actions easier for the maintenance unit. This may also enable in suitably cleaning or charging the battery of the drone.

In one embodiment, each of the at least one landing structure comprises means to detachably attach the drone to the landing structure. For example, the means to detachably attach the drone may comprise hooks and/or clamps for holding the drone; and a second actuator that is operable to control the hooks and/or the clamps. The second actuator may include at least one motor and motion transmission elements for moving the hooks and/or clamps to attach the drone with the landing structure. In another embodiment, the means to detachably attach the drone comprises an electro-magnet. The means to detachably attach the drone may enable in suitably mounting the drone on the landing structure during maintenance action and for sheltering.

The apparatus also includes means for supporting the base structure on ground, the means for supporting the base structure operable to alter position of the base structure to provide shelter to the landing structure.

According to an embodiment, the means for supporting the base structure is arranged in a ground-pit. Further, the means for supporting the base structure is operable to provide the base structure at least one of a lateral movement, a rotational movement, and a vertical movement in relation to the ground. Specifically, the means for supporting the base structure is operable to move the apparatus to accommodate the apparatus substantially within the ground-pit. Also, the means for supporting the base structure is operable to raise the landing structure out of the ground-pit. For example, the means for supporting the base structure is operable to move the apparatus vertically with respect to the ground-pit for being accommodated within, or raised out of the ground-pit.

In one embodiment, the means for supporting the base structure also acts as a support stand adapted to support the base structure on the ground, particularly, within the ground-pit. In one embodiment, the means for supporting the base structure may include a piston and cylinder assembly operable to raise and lower the landing structure from and into the ground-pit. Further, the piston and cylinder may be an electro-mechanical or electro-fluidic arrangement operable to raise and lower the landing structure. For example, the means for supporting the base structure may be operable to raise the landing structure 1 to 2feet above the ground-pit. Similarly, the means for supporting the base structure may be operable to lower the landing structure, such that the landing structure is suitably accommodated within the ground-pit.

According to an embodiment, the means for supporting the base structure enables in saving the landing structure (and the drones housed within the apparatus) from harsh weather conditions, such as storm, tornado, flood, snow and the like. For example, in case of flood or heavy rain the landing structure may be raised above the ground-pit, and in case of storm or tornado the landing structure may be lowered into the ground-pit for saving the landing structure (and drones) from such harsh weather conditions.

In one embodiment, the apparatus further comprises a flexible cover arranged between the base structure and a ground surface to cover the ground-pit. The flexible cover is stretchable to accommodate the movement of the means for supporting the base structure, i.e. lowering and raising of the landing structure. The flexible cover enables in preventing unwanted material, such as dust, debris, water and snow, to enter into the ground-pit. In an example, the flexible cover may be made of stretchable material, such as polyethylene and the like.

In another embodiment, the apparatus of the present disclosure also includes means for preventing growth of vegetation in proximity of the apparatus. According to an embodiment, the means for preventing growth of vegetation may comprise an herbicide container with a pump assembly. The means for preventing growth of vegetation may also include spray nozzles. The pump assembly may be operatively coupled to the spray nozzles using hoses. In one embodiment, the means for preventing growth of vegetation (i.e. the herbicide container, the pump assembly, the spray nozzles and the hoses) may be arranged underneath the base structure. The means (for preventing growth of vegetation) may be operable to periodically spray herbicide, such as glyphosate (Roundup®), to prevent unwanted vegetation to grow around the apparatus. This enables in avoiding hindrances or obstructions that may be caused by the unwanted vegetation for the drone's flight.

In another embodiment, the apparatus of the present disclosure may also include means for preventing problems that may be caused by inhabiting insects, birds or animals around the apparatus. For example, the apparatus may include an insecticide container with a pump assembly that periodically sprays insecticide to stop the growth of insects around the apparatus. Further, the apparatus may include a container for containing bird repellent chemical (Avian Control®) and a pump assembly for periodically spraying such bird repellent chemical around the apparatus to deter birds. Additionally, the apparatus may include a container containing animal repellent chemical (Cinnamamide) and a pump assembly for periodically spraying such animal repellent chemical around the apparatus to deter animals. In addition to this, the apparatus may also include other physical, electrical or any means of their combination that enables in preventing problems that may be caused by insects, birds and animals.

In one embodiment, the apparatus may further comprise a roof, and a third actuator that is operable to selectively open or close the roof. The roof may cover the various parts of the apparatus, such as the maintenance unit, the base structure and the landing structure of the apparatus. Also, the roof may enable in housing a drone, stationed within the apparatus. The roof may enable in protecting the various parts of the apparatus, and the drone against adverse weather conditions, such as rain, snow, and so forth. Also, the roof may prevent accumulation of unwanted elements, such as dust, leaves, insects and so forth, on the apparatus. For example, the roof may be made of dirt repellent material, such as Teflon, titanium dioxide and so forth.

In one embodiment, the roof may include various shapes and sizes that may enable in forming a hollow space to accommodate the various parts of the apparatus (such as at least one maintenance unit, the base structure and at least one landing structure) and the at least one drone therein. According to an embodiment, both the roof and the base structure include an aerodynamic shape to constitute a streamlined structure. For example, the base structure may include a symmetrical airfoil shape, and the roof may include a pair of teardrop shaped halves. The streamlined structure constituted by the aerodynamic shapes (of the base structure and the roof) enables in minimizing directional air flow friction. Specifically, the streamlined structure enables in aligning the apparatus along with an airflow direction to minimize the directional airflow friction. For example, the means for supporting the base structure may enable in rotating the base structure; and the streamlined structure may enable in aligning the apparatus along with the airflow direction to minimize the directional airflow friction.

In an embodiment, the pair of teardrop shaped halves may move with respect to each other for the opening and closing of the roof. This allows the drones to takeoff or land from within the apparatus. Further, edges of the pair of teardrop shaped halves may marginally overlap to form a closed hollow aerodynamic roof to house the various parts of the apparatus and drones therein. In another embodiment, the roof may include a substantially hemi-spherical shape or a gable roof.

In an embodiment, the third actuator is operable to selectively open or close the roof. Specifically, the third actuator may be operable to move the pair of teardrop shaped halves at least linearly, laterally, angularly or slidably to selectively open or close the roof. In an example, the third actuator may include at least one motor, support struts, and motion transmission means, such as gears, shafts and so forth. The roof (particularly, the pair of teardrop shaped halves) may be mounted on the support struts via hinges. Further, the motion transmission means may be operable to move the pair of teardrop shaped halves about the hinges for the opening and closing of the roof.

In one embodiment, the apparatus comprises a heating unit for heating at least the base structure and the at least one landing structure to prevent ice and snow from accumulating on surfaces of the base structure and the at least one landing structure. The heating unit may comprise an electrical power source and heat generating elements, such as electrodes, wires and so forth. The heat generating elements may be embedded in the base structure and the landing structure. In one embodiment, the heat generating elements may be embedded in the roof. Further, the heat generating elements may be connected to the electrical power source to derive electrical energy therefrom and convert the electrical energy into heat energy. The heating unit may be operated periodically to dissipate heat from various parts of the apparatus (such as the base structure, the landing structure and the roof) to prevent accumulation of ice and snow thereon.

DETAILED DESCRIPTION OF THE DRAWINGS

Referring to FIG. 1, illustrated is a schematic illustration of an apparatus 100 for providing maintenance and shelter to at least one drone, in accordance with an embodiment of the present disclosure. As shown the apparatus 100 includes at least one maintenance unit, such as a maintenance unit 110, operable to provide maintenance to at least one drone, such as a drone 120. The apparatus 100 also includes a base structure 130 for providing support to the maintenance unit 110. Further, the base structure 130 may be supported by a means 132 for supporting the base structure 130 in a ground-pit 134. The means 132 for supporting the base structure 130 is operable to alter position of the base structure 130 in relation to the ground-pit 134, i.e. raised or lowered with respect to the ground-pit 134.

The apparatus 100 also includes at least one landing structure, such as a landing structure 140, suitable for the drone 120 to land thereat. The each of the at least one landing structure 140 includes a first actuator 142. The first actuator 142 is operable to move (laterally, rotationally and vertically) the landing structure 140 in relation to the base structure 130 to align the drone 120 landed on the landing structure 140 with respect to the maintenance unit 110. This enables the maintenance unit 110 to provide maintenance to the drone 120. The each of the at least one landing structure 140 includes means 144 to detachably attach the drone 120 to the landing structure 140. For example, the means 144 includes electromagnets or an arrangement of hooks (and/or clamps) and a second actuator.

The apparatus 100 also includes a means for preventing growth of vegetation in proximity of the apparatus 100. As shown, the means includes a pump assembly 150 and nozzles 152, is arranged on the base structure 130 and operable to spray herbicide to prevent growth of unwanted vegetation around the apparatus 100. The apparatus 100 further includes a roof, such as teardrop shaped halves 160 and 162, and a third actuator, such as support struts 164 and 166 with hinges formed therein, to selectively open or close the roof. The apparatus 100 also includes a heating unit 170 for heating at least the base structure 130 and the landing structure 140 to prevent ice and snow from accumulating on surfaces of the base structure 130 and the landing structure 140. The apparatus 100 includes a flexible cover 180 arranged between the base structure 130 and a ground surface 136 to cover the ground-pit 134.

Figure 2:
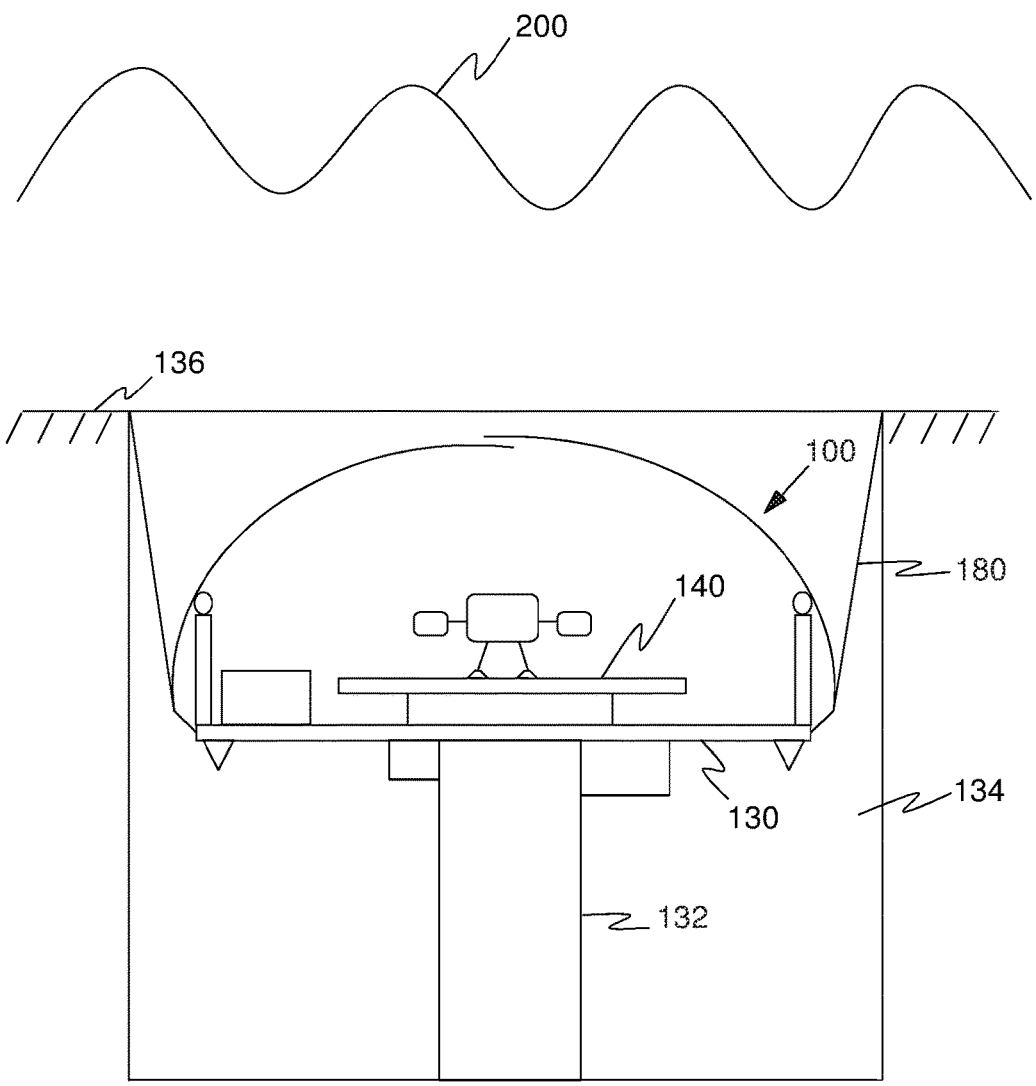
FIGS. 2 and 3 are schematic illustrations of the apparatus of FIG. 1 in operation, in accordance with various embodiments of the present disclosure.

Referring to FIG. 2, illustrated is a schematic illustration of the apparatus 100 of FIG. 1 in operation, in accordance with an embodiment of the present disclosure. As shown, the means 132 for supporting the base structure 130 is moved vertically down to alter the position of the landing structure 140 with respect to the ground surface 136 (or the ground-pit 134). This enables in preventing the apparatus 100 from severe weather conditions 200, such as hurricanes, tornadoes, high wind and so forth. The flexible cover 180 changes its position to protect the ground pit 180 from debris caused by the severe weather conditions 200.

Figure 3:
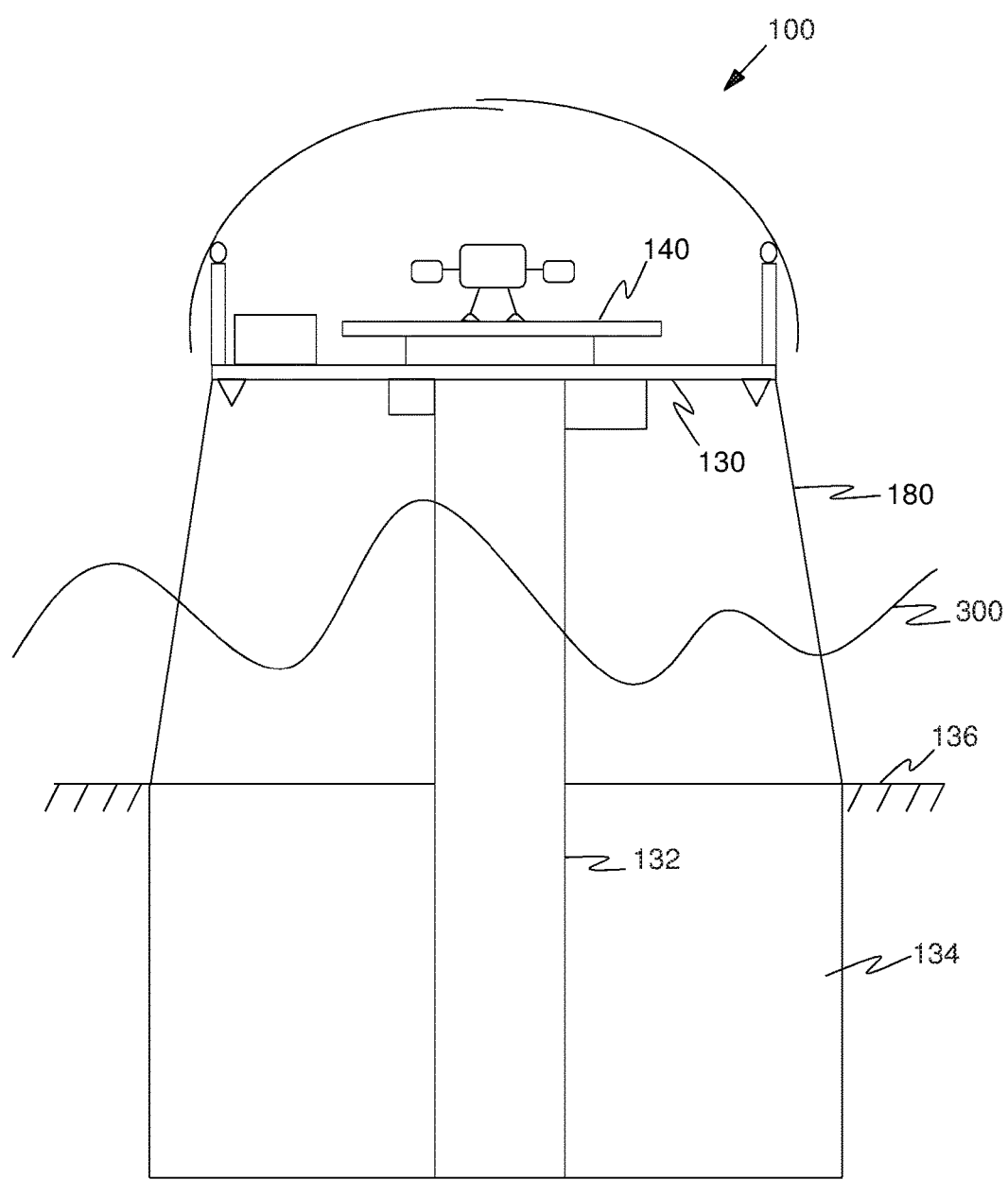

Referring to FIG. 3, illustrated is another schematic illustration of the apparatus 100 of FIG. 1 in operation, in accordance with another embodiment of the present disclosure. As shown, the means 130 for supporting the base structure 130 is moved vertically up to alter the position of the landing structure 140 with respect to the ground surface 136 (or the ground-pit 134). This enables in preventing the apparatus 100 from severe weather conditions, such as floods 300. Further, the position of the flexible cover 180 changes to protect the ground pit 134 from debris caused by the severe weather conditions 300.

Figure 4:
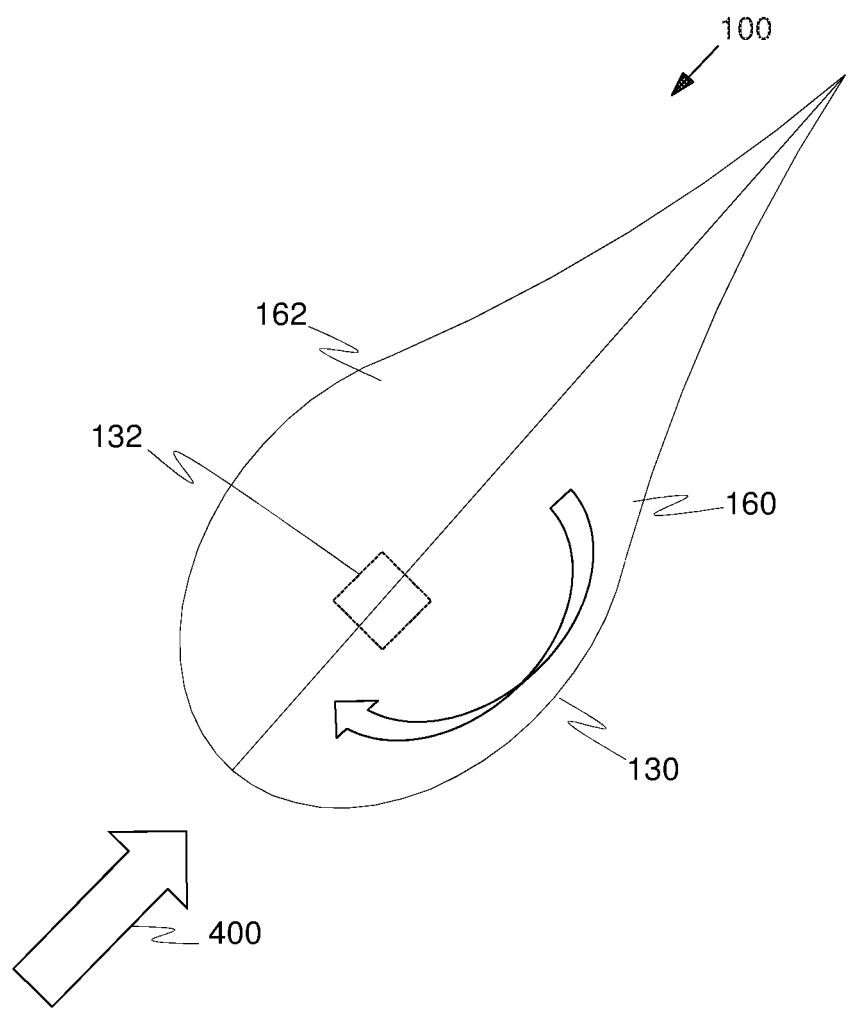
FIG. 4 is a schematic illustration of a top view of the apparatus of FIG. 1, in accordance with an embodiment of the present disclosure.

Referring to FIG. 4, illustrated is a schematic illustration of a top view of the apparatus 100 of FIG. 1, in accordance with an embodiment of the present disclosure. As shown, the roof (such as the teardrop shaped halves 160 and 162), and the base structure 130 include an aerodynamic shape to constitute a streamlined structure. Further, the roof and the base structure 130 rotate with the help of the means 132 for supporting the base structure 130 to align the apparatus 100 along a direction of the wind 400 to enable in minimizing directional air flow friction for the apparatus 100.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for providing maintenance and shelter to at least one drone, the apparatus comprising:
    at least one maintenance unit operable to provide maintenance to a drone that has arrived for maintenance;
    a base structure fixed within a ground pit to a support, the base structure being configured for providing support to the at least one maintenance unit;
    at least one landing structure suitable for the drone to land on, wherein each landing structure comprises a first actuator that is operable to move the at least one landing structure in relation to the base structure, so as to align the drone landed on the at least one landing structure with respect to the at least one maintenance unit, thereby enabling the at least one maintenance unit to provide maintenance to the drone; and
    wherein the support is configured to lower and raise the apparatus into and out of the ground pit.

2. The apparatus of claim 1, wherein the at least one maintenance unit comprises at least one of: a battery changing unit, a battery charging unit, a cleaning unit, a measurement-device changing unit, and a replaceable-part changing unit.

3. The apparatus of claim 1, wherein a movement of the at least one landing structure in relation to the base structure comprises at least one of: a lateral movement, a rotational movement, and a vertical movement.

4. The apparatus of claim 1, further comprising a spray pump and nozzles configured to dispense herbicide for preventing growth of vegetation in proximity of the apparatus.

5. The apparatus of claim 1, further comprising a heating unit for heating at least the base structure and the at least one landing structure to prevent ice and snow to accumulate on surfaces of the base structure and the at least one landing structure.

6. The apparatus of claim 1, further comprising:
    a roof; and
    a third actuator that is operable to selectively open or close the roof.

7. The apparatus of claim 6, wherein a shape of the roof and the base structure is a streamlined structure.

8. The apparatus of claim 1, wherein the support is further configured to move the base structure one or more of laterally or rotationally in relation to the ground.

9. The apparatus of claim 8, further comprising a flexible cover arranged between the base structure and a ground surface to cover the ground-pit.

10. The apparatus of claim 1, wherein each of the at least one landing structure comprises means to detachably attach the drone to the at least one landing structure.

11. The apparatus of claim 10, wherein the means to detachably attach the drone comprises:
    hooks and/or clamps for holding the drone; and
    a second actuator that is operable to control the hooks and/or the clamps.

12. The apparatus of claim 10, wherein the means to detachably attach the drone comprises an electromagnet.

\* \* \* \* \*